(12) United States Patent
Giri et al.

(10) Patent No.: US 6,614,578 B2
(45) Date of Patent: Sep. 2, 2003

(54) ULTRAVIOLET STABILIZING MATERIALS HAVING A SOLUBLIZING MOIETY

(75) Inventors: Punam Giri, Holland, MI (US); Leroy J. Kloeppner, Jenison, MI (US); Kelvin L. Baumann, Holland, MI (US); Jeffrey R. Lomprey, Holland, MI (US); Thomas F. Guarr, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 10/211,485

(22) Filed: Aug. 2, 2002

(65) Prior Publication Data

US 2003/0030883 A1 Feb. 13, 2003

Related U.S. Application Data

(63) Continuation-in-part of application No. 09/724,118, filed on Nov. 28, 2000, now Pat. No. 6,445,486, which is a continuation-in-part of application No. 09/454,043, filed on Dec. 3, 1999, now Pat. No. 6,262,832.

(51) Int. Cl.[7] .......................... G02F 1/15; G02F 1/153; F21V 9/00

(52) U.S. Cl. ..................... 359/265; 359/267; 359/270; 359/273; 252/582

(58) Field of Search .................. 359/265, 266–275; 252/582, 583, 586; 546/257

(56) References Cited

U.S. PATENT DOCUMENTS

| | | |
|---|---|---|
| 3,766,205 A | 10/1973 | Heller et al. |
| 4,402,573 A | 9/1983 | Jones |
| 4,853,471 A | 8/1989 | Rody et al. |
| 4,902,108 A | 2/1990 | Byker |
| 5,032,498 A | 7/1991 | Rody et al. |
| 5,140,455 A | 8/1992 | Varaprasad et al. |
| 5,151,816 A | 9/1992 | Varaprasad et al. |
| 5,239,406 A | 8/1993 | Lynam |
| 5,457,564 A | 10/1995 | Leventis et al. |
| 5,679,283 A | 10/1997 | Tonar et al. |
| 5,724,187 A | 3/1998 | Varaprasad et al. |
| 5,770,114 A | 6/1998 | Byker et al. |
| 5,780,160 A * | 7/1998 | Allemand et al. .......... 428/426 |
| 5,818,636 A | 10/1998 | Leventis et al. |
| 5,859,722 A | 1/1999 | Suga et al. |
| 5,910,854 A | 6/1999 | Varaprasad et al. |
| 5,998,617 A | 12/1999 | Srinivasa et al. |
| 6,002,511 A | 12/1999 | Varaprasad et al. |
| 6,154,306 A | 11/2000 | Varaprasad et al. |
| 6,183,878 B1 | 2/2001 | Berneth et al. |
| 6,187,845 B1 | 2/2001 | Renz et al. |
| 6,188,505 B1 | 2/2001 | Lomprey et al. |
| 6,193,912 B1 | 2/2001 | Theiste et al. |
| 6,241,916 B1 | 6/2001 | Claussen et al. |
| 6,262,832 B1 | 7/2001 | Lomprey et al. |
| 6,277,307 B1 | 8/2001 | Berneth et al. |
| 6,301,038 B1 | 10/2001 | Fitzmaurice et al. |
| 6,445,486 B1 | 9/2002 | Lomprey et al. |

FOREIGN PATENT DOCUMENTS

| | | |
|---|---|---|
| RU | 830456 A1 | 4/1980 |
| WO | WO 97/30135 | 2/1997 |

* cited by examiner

*Primary Examiner*—Hung Xuan Dang
*Assistant Examiner*—Tuyen Tra
(74) *Attorney, Agent, or Firm*—King & Jovanovic, PLC

(57) ABSTRACT

The present invention is directed to an electrochromic medium for use in an electrochromic device comprising at least one solvent, an anodic material, a cathodic material, wherein both of the anodic and cathodic materials are electroactive and at least one of the anodic and cathodic materials is electrochromic, and an ultraviolet stabilizing material, wherein the ultraviolet stabilizing material includes a solublizing moiety which serves to increase solubility of the ultraviolet stabilizing material relative to the same without the solublizing moiety.

25 Claims, 1 Drawing Sheet

ULTRAVIOLET STABILIZING MATERIALS HAVING A SOLUBLIZING MOIETY

CROSS-REFERENCE TO RELATED APPLICATIONS

This application is a continuation-in-part of U.S. application Ser. No. 09/724,118, filed Nov. 28, 2000 now U.S. Pat. No. 6,445,486, which is a continuation-in-part of U.S. application Ser. No. 09/454,043, filed Dec. 3, 1999, now U.S. Pat. No. 6,262,832, which are hereby incorporated herein by reference in their entirety.

BACKGROUND OF THE INVENTION

1. Field of the Invention

The present invention relates in general to ultraviolet stabilizing materials for use in electrochromic devices and, more particularly, to an ultraviolet stabilizing material associated with a solublizing moiety which serves to increase the solubility of the ultraviolet stabilizing material in an associated solvent relative to the same without such a solublizing moiety.

2. Background Art

Electrochromic devices have been known in the art for several years. Furthermore, experimentation associated with the utilization of various ultraviolet stabilizing materials has also been explored. While the utilization of such ultraviolet stabilizing materials in devices such as electrochromic mirrors and windows has been identified, the solubility characteristics of many of these ultraviolet stabilizing materials remains problematic for commercial applications especially where the particular device is routinely exposed to extreme climate variations.

It is therefore an object of the present invention to provide an ultraviolet stabilizing material with a solublizing moiety that remedies the aforementioned detriments and/or complications associated with the incorporation of the above-identified ultraviolet stabilizing materials into a suitable electrochromic medium at an operatively acceptable concentration.

SUMMARY OF THE INVENTION

The present invention is directed to an electrochromic medium for use in an electrochromic device comprising: (a) at least one solvent; (b) an anodic material; (c) a cathodic material, wherein both of the anodic and cathodic materials are electroactive and at least one of the anodic and cathodic materials is electrochromic; and (d) an ultraviolet stabilizing material, wherein the ultraviolet stabilizing material includes a solublizing moiety which serves to increase solubility of the ultraviolet stabilizing material relative to the same without the solublizing moiety.

The present invention is also directed to an electrochromic device comprising: (a) a first substantially transparent substrate having an electrically conductive material associated therewith; (b) a second substrate having an electrically conductive material associated therewith; and (c) an electrochromic medium contained within a chamber positioned between the first and second substrates which comprises: (1) at least one solvent; (2) an anodic material; (3) a cathodic material, wherein both of the anodic and cathodic materials are electroactive and at least one of the anodic and cathodic materials is electrochromic; and (4) an ultraviolet stabilizing material, wherein the ultraviolet stabilizing material includes a solublizing moiety which serves to increase solubility of the ultraviolet stabilizing material relative to the same without the solublizing moiety.

These and other objectives of the present invention will become apparent in light of the present specification, claims, and drawings.

BRIEF DESCRIPTION OF THE DRAWINGS

The invention will now be described with reference to the drawings wherein.

DETAILED DESCRIPTION OF THE INVENTION

Figure 1:
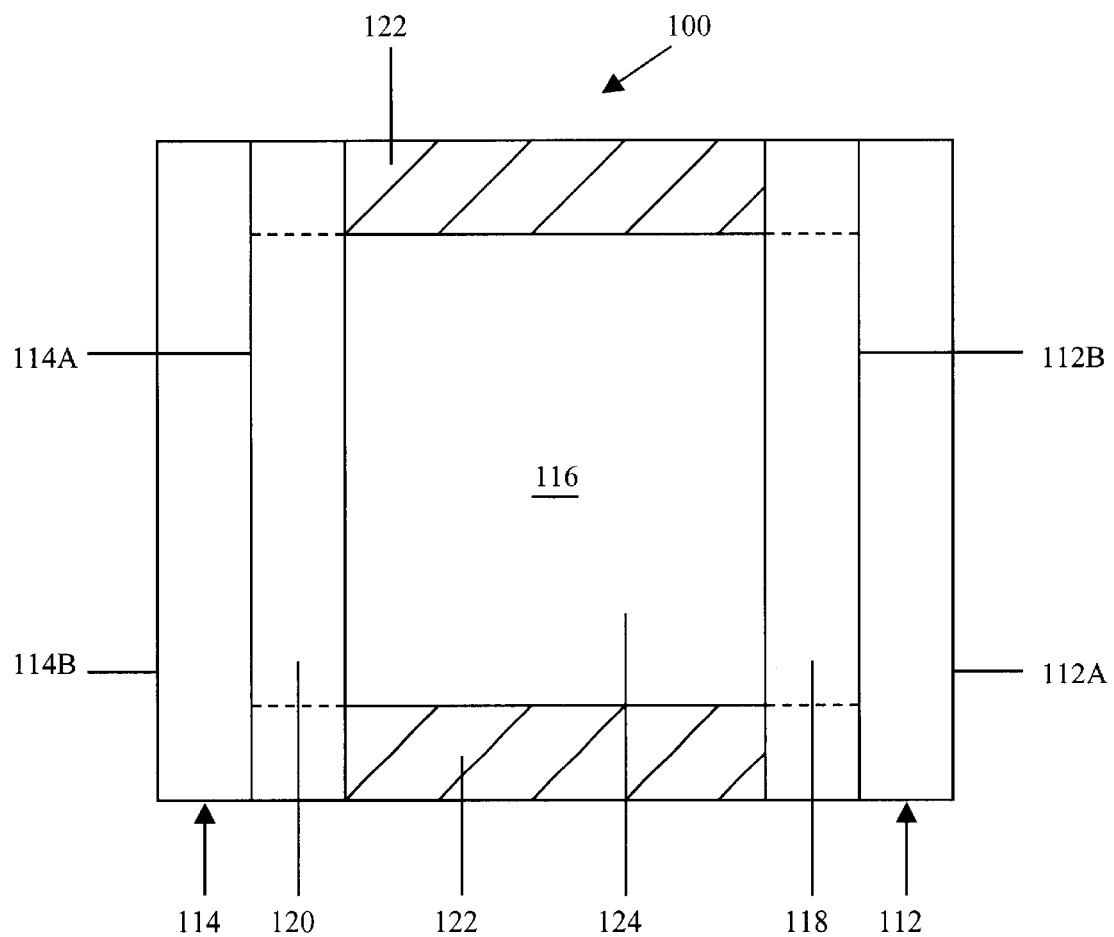
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first substrate 112 having front surface 112A and rear surface 112B, second substrate 114 having front surface 114A and rear surface 114B, and chamber 116 for containing electrochromic medium 124. It will be understood that electrochromic device 100 may comprise, for illustrative purposes only, a mirror, a window, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector" and U.S. application Ser. No. 09/343,345 entitled "Electrode Design For Electrochromic Devices," both of which are hereby incorporated herein by reference in their entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas®, which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun.

Second substrate 114 may be fabricated from similar materials as that of first substrate 112. However, if the electrochromic device is a mirror, then the requisite of substantial transparency is not necessary. As such, second substrate 114 may, alternatively, comprise polymers, metals, glass, and ceramics—to name a few. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered, heat strengthened, and/or chemically strengthened, prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffusion or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide or other materials known to those having ordinary skill in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116.

Electrically conductive material 120 may vary depending upon the intended use of the electrochromic device. For example, if the electrochromic device is a mirror, then the material may comprise a transparent conductive coating similar to electrically conductive material 118 (in which case a reflector is associated with rear surface 114B of second substrate 114). Alternatively, electrically conductive material 120 may comprise a layer of reflective material in accordance with the teachings of previously referenced and incorporated U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

Sealing member 122 may comprise any material that is capable of being adhesively bonded to the electrically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. Nos. 4,297,401; 4,418,102; 4,695,490; 5,596,023; 5,596,024; and 6,157,480, all of which are hereby incorporated herein by reference in their entirety.

For purposes of the present disclosure, electrochromic medium 124 comprises at least one solvent, an anodic material, a cathodic material, and an ultraviolet stabilizing material, wherein the ultraviolet stabilizing material includes a solublizing moiety which serves to increase solubility of the ultraviolet stabilizing material relative to the same without the solublizing moiety.

Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

(1) Single-layer, single-phase—The electrochromic medium may comprise a single-layer of material which may include small non-homogenous regions and includes solution-phase devices where a material may be contained in solution in the ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same" and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617, U.S. Pat. No. 6,020,987, U.S. Pat. No. 6,037,471, U.S. Pat. No. 6,141,137 and PCT Application Publication No. WO98/44348, all of which are hereby incorporated herein by reference in their entirety.

The anodic and cathodic materials may also be combined or linked by a bridging unit as described in International Application Serial No. PCT/WO97/30134 entitled "Electrochromic System," which is hereby incorporated herein by reference in its entirety. The electrochromic materials can additionally include near infrared (NIR) absorbing compounds as described in U.S. Pat. No. 6,193,912, which is also hereby incorporated by reference in its entirety.

It is also possible to link anodic materials or cathodic materials by similar methods. The concepts described in these applications/patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369 entitled "Coupled Electrochromic Compounds With Photostable Oxidation States," which is hereby incorporated herein by reference in its entirety.

The concentration of the electrochromic materials can be selected as taught in U.S. Pat. No. 6,137,620 entitled "Electrochromic Media With Concentration Enhanced Stability, Process For The Preparation Thereof, and Use In Electrochromic Devices," the entirety of which is hereby incorporated herein by reference.

Additionally, a single-layer, single-phase medium may include a medium where the anodic and cathodic materials are incorporated into a polymer matrix as is described in International Application Serial No. PCT/WO99/02621 entitled "Electrochromic Polymer System" which is hereby incorporated herein by reference it its entirety, and International Patent Application Serial No. PCT/US98/05570 entitled "Electrochromic Polymeric Solid Films, Manufacturing Electrochromic Devices Using Such Solid Films, And Processes For Making Such Solid Films And Devices."

(2) Multi-layer—the medium may be made up in layers and includes a material attached directly to an electrically conducting electrode or confined in close proximity thereto which remains attached or confined when electrochemically oxidized or reduced.

(3) Multi-phase—one or more materials in the medium undergoes a change in phase during the operation of the device, for example a material contained in solution in the ionically conducting electrolyte forms a layer on the electrically conducting electrode when electrochemically oxidized or reduced.

Conventional anodic materials may include any one of a number of materials including ferrocene, substituted ferrocenes, substituted ferrocenyl salts, substituted phenazines, phenothiazine, substituted phenothiazines, thianthrene, substituted thianthrenes. Examples of anodic materials may include di-tert-butyl-diethylferrocene, 5,10-dimethyl-5,10-dihydrophenazine, 3,7,10-trimethylphenothiazine, 2,3,7,8-tetramethoxythianthrene, and 10-methylphenothiazine. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," and U.S. application Ser. No. 10/054,108 entitled "Controlled Diffusion Coefficient Electrochromic Materials For Use In Electrochromic Mediums And Associated Electrochromic Devices," all of which are hereby incorporated herein by reference in their entirety.

Conventional cathodic materials may include, for example, viologens, such as methyl viologen tetrafluoroborate, octyl viologen tetrafluoroborate, or benzyl viologen tetrafluoroborate. It will be understood that the preparation and/or commercial availability for each of the above-identified cathodic materials is well known in the art. While specific cathodic materials have been provided, for illustrative purposes only, numerous other conventional cathodic materials are likewise contemplated for use including, but by no means limited to, those disclosed in previously referenced and incorporated U.S. Pat. No. 4,902, 108 and U.S. application Ser. No. 10/054,108 entitled "Controlled Diffusion Coefficient Electrochromic Materials For Use In Electrochromic Mediums And Associated Electrochromic Devices." Indeed, the only contemplated limitation relative to the cathodic material is that it should not adversely affect the electrochromic performance of the device 100. Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the anodic and cathodic materials can range from approximately 1 mM to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

For purposes of the present disclosure, the solvent of electrochromic medium 124 may comprise any one of a number of common, commercially available solvents including 3-methylsulfolane, glutaronitrile, dimethyl sulfoxide, dimethyl formamide, acetonitrile, tetraglyme and other polyethers, alcohols such as ethoxyethanol, nitrites, such as 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate (PC), ethylene carbonate and homogenous mixtures of the same.

In addition, electrochromic medium 124 may comprise other materials, such as thermal stabilizers, antioxidants, thickeners, viscosity modifiers, tint providing agents, redox buffers, and mixtures thereof.

In accordance with the present invention, the electrochromic medium also comprises one or more ultraviolet stabilizing materials which are associated with a solublizing moiety. For purposes of the present disclosure, the ultraviolet stabilizing material may include substituted benzotriazoles represented by the following formula:

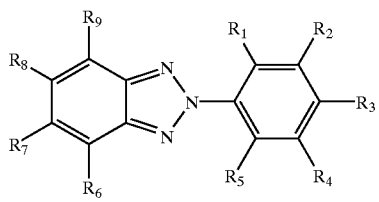

wherein $R_1$ is OH; wherein $R_2$–$R_9$ are the same or different and comprise H, OH, a halide, or a straight or branched alkyl, aryl, alkaryl, arakyl, alkoxy, or carboxy group containing 1 to approximately 20 carbon atoms; and wherein at least one of $R_2$–$R_9$ is associated with a solublizing moiety disclosed herein below.

As will be explained in greater detail and verified experimentally herein below, a solublizing moiety can be associated with one or more ultraviolet stabilizing materials which serves to materially increase the solubility of the associated material relative to the same without such a solublizing moiety. Such increased solubility is highly desirous, inasmuch as, for example, many ultraviolet stabilizing materials can exhibit problematic solubility (e.g. fogging, precipitation, phase separation, etcetera) in common, commercially available solvents—especially in cold temperatures.

For purposes of the present disclosure, the solublizing moiety may comprise phosphonium constituents, ammonium constituents, amides, ethers, and polyethers. For example, the solublizing moiety may be represented by one or more of the following formulae:

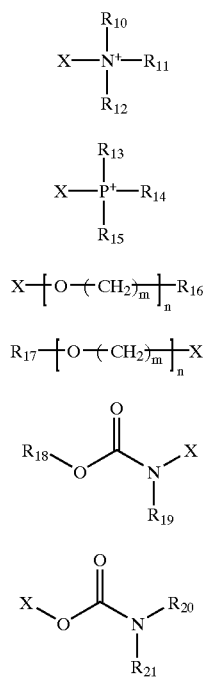

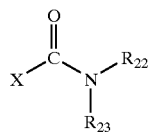

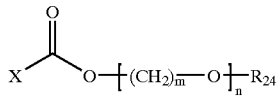

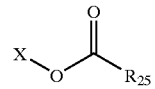

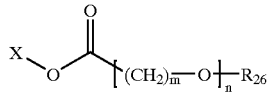

wherein $R_{10}$–$R_{26}$ are the same or different and comprise H or a straight or branched alkyl, aryl, alkaryl, or aralkyl group containing 1 to approximately 10 carbon atoms, wherein m is an integer ranging from 1 to approximately 10, wherein n is an integer ranging from 1 to approximately 20, wherein X is associated with the ultraviolet stabilizing material and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, one or more of structures I–X, and mixtures thereof.

Although not shown, it will be understood that many of the solublizing moieties comprise ionic constituents which are associated with balancing counter ions such as anions including halides, trifluoromethanesulfonate, bis(trifluoromethane)sulfon-amide, tetrafluoroborate, tetraphenylborate, hexafluorophosphate, or other similar anions.

Electrochromic devices having as a component part an above-identified ultraviolet stabilizing material can be used in a wide variety of applications wherein, under normal operation, the transmitted or reflected light can be modulated—the skill of which is well known in the art. Such devices include rear-view mirrors for vehicles; windows for the exterior of a building, home or vehicle; skylights for buildings including tubular light filters; windows in office or room partitions; display devices; contrast enhancement filters for displays; light filters for photographic devices and light sensors; and indicators for power cells as well as primary and secondary electrochemical cells.

The electrochromic media of the present invention utilize many different ultraviolet stabilizing materials which, for purposes of clarification, are provided herein below showing their structures and chemical names and the abbreviations used herein in order to alleviate any ambiguity in discussing same. The preparation and/or commercially available sources are provided herein, unless the material is well known in the art. It will be understood that, unless specified otherwise, the starting reagents or ultraviolet stabilizing materials are commercially available from Aldrich Chemical Co., of Milwaukee, Wis., Ciba-Geigy Corp., and/or other common chemical suppliers. It will be further understood that conventional chemical abbreviations will be used when appropriate including the following: grams (g); milliliters (ml); moles (mol); millimoles (mmol); molar (M); millimolar (mM); pounds per square inch (psi); and hours (h).

Tinuvin 384 3-[3-(2H-Benzotriazole-2-yl)-5-(1,1-dimethylethyl)-4-Hydroxybenzene]Propionic Acid C7–C9 Ester

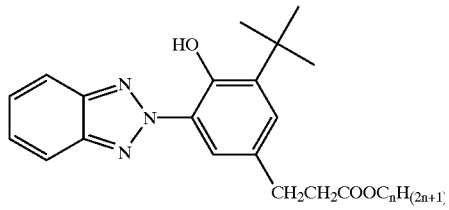

wherein n ranges from 7–9

Pentyl Ester of Tinuvin 384 3-[3-(2H-Benzotriazole-2-yl)-5-(1,1-Dimethylethyl)-4-Hydroxybenzene]Propionic Acid Pentyl Ester

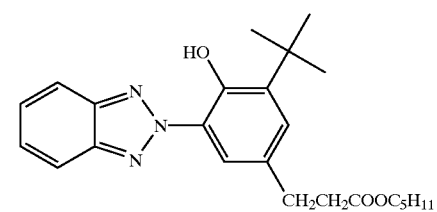

TP1

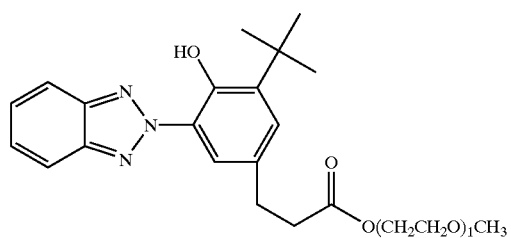

Synthesis of TP1

TP1 was prepared by refluxing 50 g (0.1 mol) of Tinuvin 384 and 1.0 g of p-toluenesulfonic acid in 133 ml (30 eq.) of methanol for 24 hours. The resulting mixture was cooled to room temperature to precipitate the product which, in turn, was collected by filtration. The solid was washed with methanol and dried to give 36 g (92% yield) of 3-[3-(2H-benzotriazole-2-yl)-5-(1,1-dimethylethyl)-4-hydroxybenzene] propionic acid methyl ester.

36 g of 3-[3-(2H-benzotriazole-2-yl)-5-(1,1-dimethylethyl)-4-hydroxybenzene] propionic acid methyl ester was dissolved in 100 ml of toluene and heated to reflux to azeotropically remove the residual methanol. Reflux was continued until the temperature reached 110° C. To the toluene solution was added 32 ml (4 eq.) of 2-methoxy-ethanol and 1.0 g of p-toluenesulfonic acid. The solution was heated to 108° C. and the condensed methanol was removed from the reaction by use of a Dean-Stark condenser. Completion of the reaction required 24 to 48 hours. The reaction was then quenched by addition of 100 ml of water to the reaction mixture followed by three water washes. After separating the layers, the water layer was discarded, and the solvent was removed from the organic layer via rotary evaporation. 200 ml of methanol was then added and the mixture was allowed to reach room temperature. Finally, the mixture was filtered and the solid was washed with methanol to yield 35 g of TP1 (81%) as a white solid.

TP2

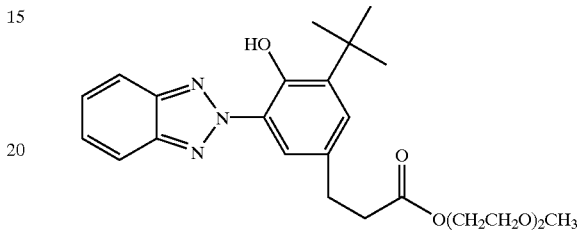

Synthesis of TP2

TP2 was prepared by first preparing 3-[3-(2H-benzotriazole-2-yl)-5-(1,1-dimethylethyl)-4-hydroxybenzene] propionic acid methyl ester in accordance with the synthesis of TP1.

36 g of 3-[3-(2H-benzotriazole-2-yl)-5-(1,1-dimethylethyl)-4-hydroxybenzene] propionic acid methyl ester was then dissolved in 100 ml of toluene and heated to reflux to azeotropically remove the residual methanol. Reflux was continued until the temperature reached 110° C. To the toluene solution was added 18 ml (1.3 eq.) of 2-(2-methoxy-ethoxy)-ethanol and 1.0 g of p-toluenesulfonic acid. The solution was heated to 108° C. and the condensed methanol was removed from the reaction by use of a Dean-Stark condenser. Completion of the reaction required 24 to 48 hours. The reaction was then quenched by addition of 100 ml of water to the reaction mixture followed by three water washes. After separating the layers, the water layer was discarded, and the solvent was removed from the organic layer via rotary evaporation. 200 ml of methanol was then added and the mixture was allowed to reach room temperature. Finally, the mixture was filtered and the solid was washed with ethanol to yield 7 g of TP2 (15%) as a white solid.

TP3

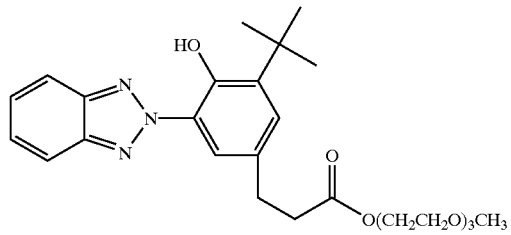

Synthesis of TP3

TP3 was prepared by first preparing 3-[3-(2H-benzotriazole-2-yl)-5-(1,1-dimethylethyl)-4-hydroxybenzene] propionic acid methyl ester in accordance with the synthesis of TP1.

25 g of 3-[3-(2H-benzotriazole-2-yl)-5-(1,1-dimethylethyl)-4-hydroxybenzene] propionic acid methyl ester was dissolved in 100 ml of toluene and heated to reflux to azeotropically remove the residual methanol. Reflux was continued until the temperature reached 110° C. To the toluene solution was added 20 ml (2.9 eq.) of 2-[2-(2-methoxy-ethoxy)-ethoxy]-ethanol and 0.5 g of p-toluenesulfonic acid. The solution was heated to 108° C. and the condensed methanol was removed from the reaction by use of a Dean-Stark condenser. Completion of the reaction required 24 to 48 hours. The reaction was then quenched by addition of 100 ml of water to the reaction mixture followed by three water washes. After separating the layers, the water layer was discarded, and the solvent was removed from the organic layer via rotary evaporation. 200 ml of methanol was then added and the mixture was allowed to reach room temperature. Finally, the mixture was filtered and the solid was washed with ethanol to yield 19.4 g of TP3 (57%) as a light yellow solid.

TPEG

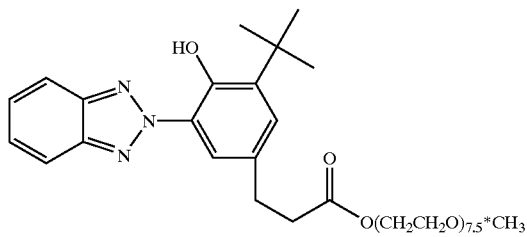

*It will be understood that 7.5 is an approximate average rather than an exact value.

Synthesis of TPEG

TPEG was prepared by first preparing 3-[3-(2H-benzotriazole-2-yl)-5-(1,1-dimethylethyl)-4-hydroxybenzene] propionic acid methyl ester in accordance with the synthesis of TP1.

22 g of 3-[3-(2H-benzotriazole-2-yl)-5-(1,1-dimethylethyl)-4-hydroxybenzene] propionic acid methyl ester was dissolved in 100 ml of toluene and heated to reflux to azeotropically remove the residual methanol. Reflux was continued until the temperature reached 110° C. To the toluene solution was added 78 ml (3.2 eq.) of $HO(CH_2CH_2O)_nCH_3$ (wherein n is approximately 7.5) and 0.5 g of p-toluenesulfonic acid. The solution was heated to 108° C. and the condensed methanol was removed from the reaction by use of a Dean-Stark condenser. Completion of the reaction required 24 to 48 hours. The reaction was then quenched by addition of 100 ml of water to the reaction mixture followed by three water washes. After separating the layers, the water layer was discarded, and the solvent was removed from the organic layer via rotary evaporation. 70 ml of ethanol was then added and the mixture was allowed to reach room temperature. The product did not solidify, so the solvent was removed via rotary evaporation to give approximately 41 g of crude TPEG (96%) as an oil.

In support of the present invention, several experiments were conducted wherein the solubility characteristics of ultraviolet stabilizing materials comprising solublizing moieties, as disclosed herein, were compared to ultraviolet stabilizing materials void of such moieties.

In the experiments below, the ultraviolet stabilizing materials were dissolved at known concentrations in at least one of a gelled fluid (Experiment 1), and 3% poly(methyl methacrylate) (PMMA) in PC (Experiment 2) whereupon their comparative solubilities were determined based on the length of time each of the ultraviolet stabilizing materials of differing concentrations remained in solution before forming a precipitate. The experiments were performed at −40° C. It should be noted that while substantial care was taken during the experiments to ensure analytical precision and accuracy, minor deviations from absolute values may have been realized due to small changes in ambient temperature and/or atmospheric pressure. Nevertheless, inasmuch as the materials prepared in accordance with the present invention exhibited increased solubility by several factors, the effect of such minor temperature and/or pressure deviations upon the solubility characteristics of the materials is immaterial.

Experiment No. 1
Low Temperature Solubility in a Gelled Fluid

| Ultraviolet Stabilizing Material | Concentration (mM) | Time Before Precipitate Formation (at −40° C.) |
| --- | --- | --- |
| Pentyl Ester of Tinuvin 384 | 25 | 120 h |
| Pentyl Ester of Tinuvin 384 | 30 | 96 h |
| Pentyl Ester of Tinuvin 384 | 35 | 72 h |
| TP1 | 25 | No precipitate formation |
| TP1 | 30 | No precipitate formation |
| TP1 | 35 | No precipitate formation |
| TP3 | 25 | No precipitate formation |
| TP3 | 30 | No precipitate formation |
| TP3 | 35 | No precipitate formation |
| TP3 | 140 | No precipitate formation |
| TPEG* | 500 | No precipitate formation |

*The TPEG was introduced into a fluid which was compositionally the same as the remainder of the above-identified ultraviolet stabilizing materials, however, without gel formation.

In this experiment TP1, TP3, and TPEG comprised ultraviolet stabilizing materials having a solublizing moiety which materially increases solubility of the same in a gelled fluid which was prepared in accordance with the teaching of U.S. application Ser. No. 09/940,944 entitled "Electrochromic Medium Having a Self-Healing Cross-Linked Polymer Gel and Associated Electrochromic Device" which is hereby incorporated herein by reference in its entirety. In particular, the gelled fluid reagents comprised 0.2% hexamethylene diisocyanate trimer (HDT), 2.0% $^{1}\!/_{10}$ hydroxyethylmethacrylate/methyl acrylate (HEMA/MA), 27 mM of 5,10-dimethyl-5, 10-dihydrophenazine, 32 mM of octyl viologen tetrafluoroborate, 0.5 mM each of two color-stabilizing additives, 14 ppm dibutyltin diacetate (DBTDA), and PC. The electrochromic medium was crosslinked prior to initiation of low temperature solubility testing. The color-stabilizing additives utilized were incorporated according to the teachings of U.S. Pat. No. 6,188,505 B1. As can be seen from the data collected in this experiment, TP1, TP3, and TPEG each exhibited materially increased solubility relative to the pentyl ester of Tinuvin 384. In particular, the pentyl ester of Tinuvin 384 precipitated out of solution after only 72 and 120 hours at concentrations of 35 and 25 mM, respectively. In comparison, both TP1 and TP3 at concentrations of 25, 30, and 35 mM remained in solution after over 240 hours when the experiment was stopped. In addition, TP3 and TPEG at concentrations of 140 mM and 500 mM, respectively, remained in solution after over 165 hours when the experiment was stopped. It will be understood that the above-identified experiments were stopped after observing that after more than one week of testing, the materials provided no visual indication of any precipitate formation, therefore, rendering the experiments complete.

Experiment No. 2
Low Temperature Solubility in 3% PMMA in PC

| Ultraviolet Stabilizing Material | Concentration (mM) | Time Before Precipitate Formation (at −40° C.) |
|---|---|---|
| TP1 | 30 | No precipitate formation |
| TP1 | 40 | 216 h |
| TP1 | 50 | 96 h |
| TP2 | 50 | No precipitate formation |
| TP2 | 65 | 72 h |
| TP2 | 80 | 48 h |
| TP2 | 100 | 24 h |
| TP2 | 150 | 4 h |
| TP3 | 100 | No precipitate formation |
| TP3 | 150 | 24 h |

In this experiment, TP1, TP2, and TP3 each comprised an ultraviolet stabilizing material having a solublizing moiety which materially increases solubility of the same in a 3% PMMA in PC solution. As can be seen from the data collected in this experiment, TP1, TP2, and TP3 at respective concentrations of 30, 50, and 100 mM remained in solution after at least 216, 264, and 240 hours, respectively, when the experiment was stopped. In addition, while 50 mM TP1 remained in solution for 96 hours, 50 mM TP2 was able to remain in solution for more than eleven days. Furthermore, while 100 mM TP2 remained in solution for 24 hours, 100 mM TP3 was able to remain in solution for more than ten days. It will be understood that the above-identified experiments were stopped after observing that after more than one week of testing, the materials provided no visual indication of any precipitate formation, therefore, rendering the experiments complete. Therefore, this experiment demonstrates that benzotriazoles comprising longer chains of oligo-ether esters as solublizing moieties are able to substantially improve the solubilities of ultraviolet stabilizing materials.

In summary, Experiment Nos. 1–2 verify that, indeed, an ultraviolet stabilizing material that exhibits problematic solubility characteristics can become acceptably soluble with the addition of solublizing moieties in accordance with the present invention. Such an increase in solubility can be especially beneficial for electrochromic devices that are routinely exposed to extreme weather conditions inasmuch as cold temperatures can substantially, adversely affect the solubility characteristics of an associated anodic electrochromic material.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic medium for use in an electrochromic device, comprising:

at least one solvent;

an anodic material;

a cathodic material, wherein both of the anodic and cathodic materials are electroactive and at least one of the anodic and cathodic materials is electrochromic; and an ultraviolet stabilizing material, wherein the ultraviolet stabilizing material includes a solubilizing moiety which serves to increase solubility of the ultraviolet stabilizing material relative to the same without the solubilizing moiety.

2. The electrochromic medium according to claim 1, wherein the ultraviolet stabilizing material is represented by the formula:

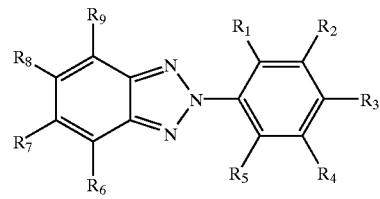

wherein $R_1$ is OH;

wherein $R_2$–$R_9$ are the same or different and comprise H, OH, a halide, or a straight or branched alkyl, aryl, alkaryl, arakyl, alkoxy, or carboxy group containing 1 to approximately 20 carbon atoms; and wherein at least one of $R_2$–$R_9$ is associated with a solubilizing moiety.

3. The electrochromic medium according to claim 1, wherein the solubilizing moiety is represented by at least one of the following formulae:

(I)

(II)

(III)

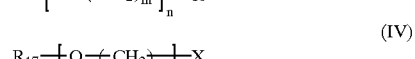

(IV)

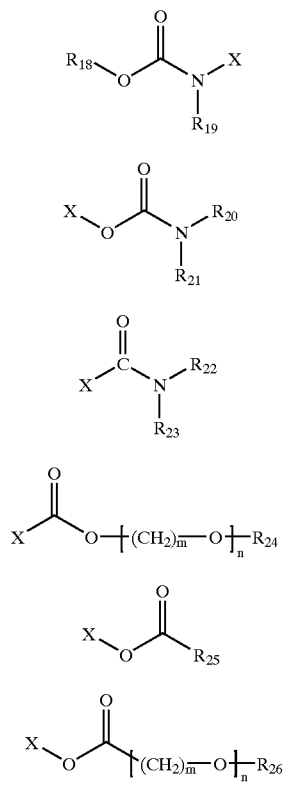

wherein $R_{10}$–$R_{26}$ are the same or different and comprise H or a straight or branched alkyl, aryl, alkaryl, or aralkyl group containing 1 to approximately 10 carbon atoms;

wherein m is an integer ranging from 1 to approximately 10;

wherein n is an integer ranging from 1 to approximately 20; and wherein X is associated with the ultraviolet stabilizing material and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, one or more of structures I–X, and mixtures thereof.

4. The electrochromic medium according to claim 1, wherein the solubilizing moiety is represented by the following formula:

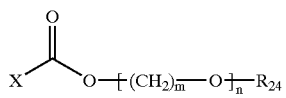

(VIII)

wherein $R_{24}$ comprises H or a straight or branched alkyl, aryl, alkaryl, or aralkyl group containing 1 to approximately 10 carbon atoms;

wherein m is an integer ranging from 1 to approximately 10;

wherein n is an integer ranging from 1 to approximately 20; and wherein X is associated with the ultraviolet stabilizing material and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof.

5. The electrochromic medium according to claim 1, wherein the ultraviolet stabilizing material is selected from at least one of the group consisting of TP1, TP2, TP3, TPEG, and mixtures thereof.

6. The electrochromic medium according to claim 1, wherein the at least one solvent is selected from the group comprising 3-methylsulfolane, glutaronitrile, dimethyl sulfoxide, dimethyl formamide, acetonitrile, polyethers including tetraglyme, alcohols including ethoxyethanol, nitriles including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate, and homogenous mixtures of the same.

7. The electrochromic medium according to claim 1, wherein said electrochromic medium comprises a viscosity modifier.

8. The electrochromic medium according to claim 1, wherein said electrochromic medium comprises a free-standing gel.

9. The electrochromic medium according to claim 1, wherein said electrochromic medium comprises a crosslinked polymer matrix.

10. An electrochromic device, comprising:
a first substantially transparent substrate having an electrically conductive material associated therewith;
a second substrate having an electrically conductive material associated therewith; and
an electrochromic medium contained within a chamber positioned between the first and second substrates which comprises:
at least one solvent;
an anodic material;
a cathodic material, wherein both of the anodic and cathodic materials are electroactive and at least one of the anodic and cathodic materials is electrochromic; and
an ultraviolet stabilizing material, wherein the ultraviolet stabilizing material includes a solubilizing moiety which serves to increase solubility of the ultraviolet stabilizing material relative to the same without the solubilizing moiety.

11. The electrochromic device according to claim 10, wherein the ultraviolet stabilizing material is represented by the formula:

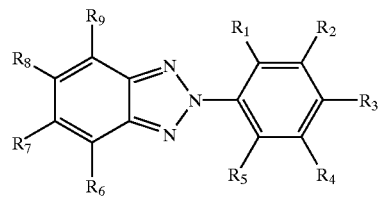

wherein $R_1$ is OH;

wherein $R_2$–$R_9$ are the same or different and comprise H, OH, a halide, or a straight or branched alkyl, aryl, alkaryl, arakyl, alkoxy, or carboxy group containing 1 to approximately 20 carbon atoms; and wherein at least one of $R_2$–$R_9$ is associated with a solubilizing moiety.

12. The electrochromic device according to claim 10, wherein the solubilizing moiety is represented by at least one of the following formulae:

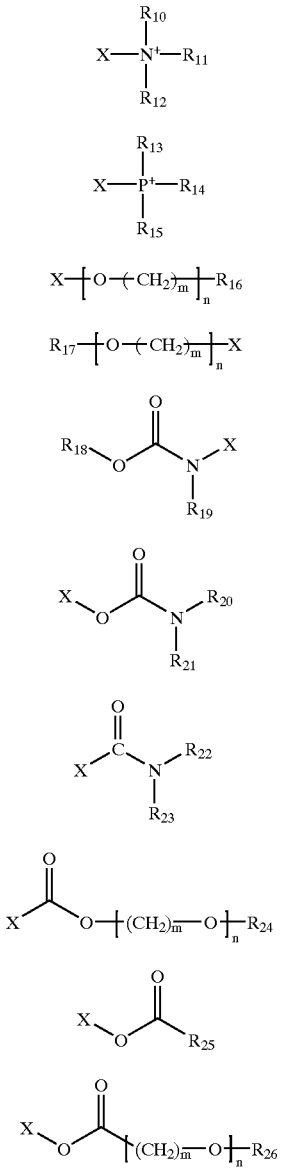

wherein $R_{10}$–$R_{26}$ are the same or different and comprise H or a straight or branched alkyl, aryl, alkaryl, or aralkyl group containing 1 to approximately 10 carbon atoms;

wherein m is an integer ranging from 1 to approximately 10;

wherein n is an integer ranging from 1 to approximately 20; and wherein X is associated with the ultraviolet stabilizing material and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, one or more of structures I–X, and mixtures thereof.

13. The electrochromic device according to claim 10, wherein the solubilizing moiety is represented by the following formula:

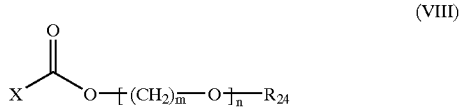

wherein $R_{24}$ comprises H or a straight or branched alkyl, aryl, alkaryl, or aralkyl group containing 1 to approximately 10 carbon atoms;

wherein m is an integer ranging from 1 to approximately 10;

wherein n is an integer ranging from 1 to approximately 20; and wherein X is associated with the ultraviolet stabilizing material and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof.

14. The electrochromic device according to claim 10, wherein the ultraviolet stabilizing material is selected from at least one of the group consisting of TP1, TP2, TP3, TPEG, and mixtures thereof.

15. The electrochromic device according to claim 10, wherein the at least one solvent is selected from the group comprising 3-methylsulfolane, glutaronitrile, dimethyl sulfoxide, dimethyl formamide, acetonitrile, polyethers including tetraglyme, alcohols including ethoxyethanol, nitrites including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate, and homogenous mixtures of the same.

16. The electrochromic device according to claim 10, wherein said electrochromic medium comprises a viscosity modifier.

17. The electrochromic device according to claim 10, wherein said electrochromic medium comprises a free-standing gel.

18. The electrochromic device according to claim 10, wherein said electrochromic medium comprises a crosslinked polymer matrix.

19. The electrochromic device according to claim 10, wherein the device is an electrochromic window.

20. The electrochromic device according to claim 10, wherein the second substrate is plated with a reflective material.

21. The electrochromic device according to claim 20, wherein the reflective material is selected from the group comprising chromium, rhodium, ruthenium, silver, alloys of the same, and mixtures thereof.

22. The electrochromic device according to claim 21, wherein the device is an electrochromic mirror.

23. An electrochromic device, comprising: a first substantially transparent substrate having an electrically conductive material associated therewith; a second substrate having an electrically conductive material associated therewith; and an electrochromic medium contained within a chamber positioned between the first and second substrates which comprises: at least one solvent; an anodic material; a cathodic material, wherein both of the anodic and cathodic materials are electroactive and at least one of the anodic and cathodic materials is electrochromic; and an ultraviolet stabilizing material, wherein the ultraviolet stabilizing material includes a solubilizing moiety which serves to increase solubility of the ultraviolet stabilizing material relative to the same without the solubilizing moiety, wherein the ultraviolet stabilizing material is represented by the formula:

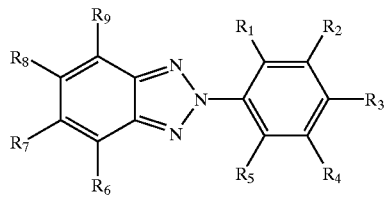

wherein $R_1$ is OH; wherein $R_2$–$R_9$ are the same or different and comprise H, OH, a halide, or a straight or branched alkyl, aryl, alkaryl, arakyl, alkoxy, or carboxy group containing 1 to approximately 20 carbon atoms; and wherein at least one of $R_2$–$R_9$ is associated with a solubilizing moiety; and wherein the solubilizing moiety is represented by at least one of the following formulae:

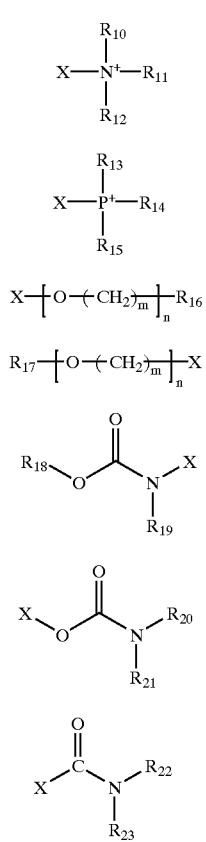

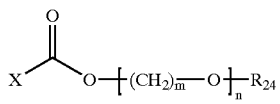

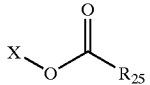

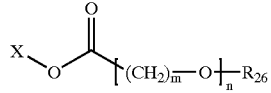

wherein $R_{10}$–$R_{26}$ are the same or different and comprise H or a straight or branched alkyl, aryl, alkaryl, or aralkyl group containing 1 to approximately 10 carbon atoms; wherein m is an integer ranging from 1 to approximately 10; wherein n is an integer ranging from 1 to approximately 20; and wherein X is associated with the ultraviolet stabilizing material and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, one or more of structures I–X, and mixtures thereof.

24. The electrochromic medium according to claim 23, wherein the solubilizing moiety is represented by the following formula:

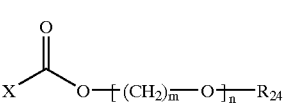

wherein $R_{24}$ comprises H or a straight or branched alkyl, aryl, alkaryl, or aralkyl group containing 1 to approximately 10 carbon atoms; wherein m is an integer ranging from 1 to approximately 10; wherein n is an integer ranging from 1 to approximately 20; and wherein X is associated with the ultraviolet stabilizing material and is selected from the group comprising a direct bond, an alkyl, aryl, alkaryl, aralkyl, ether, or polyether chain containing approximately 1 to approximately 40 carbon atoms, a silyl or siloxyl chain containing approximately 1 to approximately 40 silicon atoms, and mixtures thereof.

25. The electrochromic device according to claim 24, wherein the at least one solvent is selected from the group comprising 3-methylsulfolane, glutaronitrile, dimethyl sulfoxide, dimethyl formamide, acetonitrile, polyethers including tetraglyme, alcohols including ethoxyethanol, nitrites including 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate, and homogenous mixtures of the same.

* * * * *